3,096,206
METHOD OF MAKING MAGNETIC FERRITE FILMS

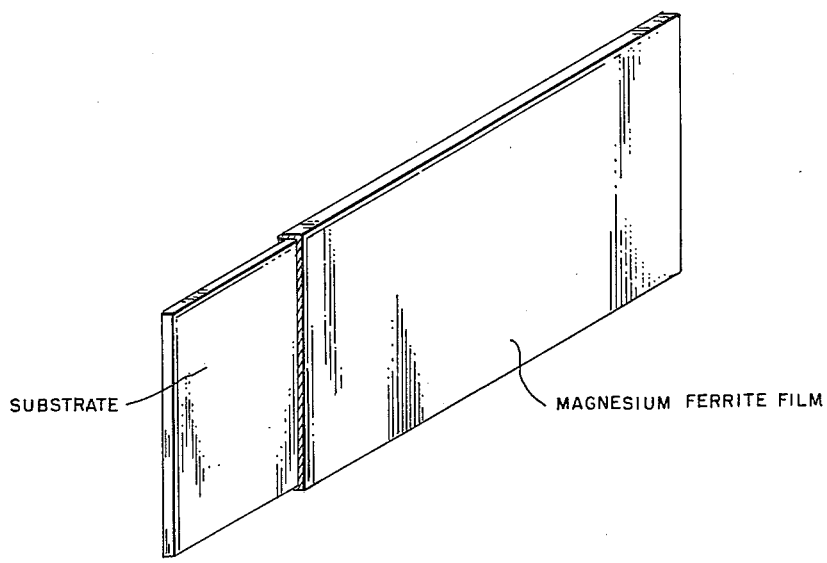

William L. Wade, Jr., Neptune Township, N.J., assignor to the United States of America as represented by the Secretary of the Army
Filed June 6, 1961, Ser. No. 115,271
1 Claim. (Cl. 117—121)
(Granted under Title 35, U.S. Code (1952), sec. 266)

The invention described herein may be manufactured and used by or for the Government for governmental purposes without the payment of any royalty thereon.

This invention relates to a method of making magnetic ferrite films, and particularly, to a method of making magnesium ferrite film from alcoholic solution and to the magnesium ferrite film so formed.

An object of this invention is to make a magnesium ferrite film of high compositional purity by a relatively short and simple technique. A further object is to make a magnesium ferrite film suitable for use in computer memories, logic circuits, and microwave devices.

It has been found that the foregoing objectives can be attained by mixing an iron alcoholate solution with a magnesium alcoholate solution in stoichiometric proportions, immersing a substrate in the solution and preliminarily firing the coated substrate at 500° C., repeating the latter step until the requisite coating thickness has been attained, and then firing the coated substrate at 1000° C.

For a better understanding of the invention, reference should be made to the accompanying drawing wherein there is shown, with word legends, a perspective view of a substrate that is temperature stable up to 1000° C. and bearing a film of magnesium ferrite according to the invention.

Before carrying out the method of the invention, it is first necessary to form the iron alcoholate and magnesium alcoholate solutions. The iron alcoholate solution can be formed in the manner disclosed and claimed in my application Serial No. 6,571, filed January 10, 1961, now U.S. Patent No. 3,049,404. In that application, iron chloride is dissolved in an organic solvent solution of an alcohol at room temperature, under anhydrous conditions. The resulting solution is then treated with anhydrous ammonia gas to precipitate all of the chlorides as ammonium chloride, and the iron alcoholate solution separated from the precipitate.

Example 1

2.5 milliliters of iron ethylate solution formed as described in the aforementioned application and containing 0.0062 gram Fe/ml. is mixed with 3.4 milliliters of magnesium methylate solution containing 0.0100 gram Mg/ml. corresponding to a ratio of 2 moles of iron to 1 mole of magnesium. (The magnesium methylate solution above was prepared by dissolving 1 gram of magnesium metal in one hundred (100) ml. of anhydrous methanol.) A fused quartz substrate is then immersed in this mixed solution with preliminary firing at 500° C. in a furnace. After cooling to room temperature, this step is repeated until the desired amount of material is deposited. Between 0.5 and 1.0 milligram of material is deposited during each operation, the thickness being ascertained by means of a supermicrometer set at one ounce pressure. The substrate is then fired at 1000° C. for one hour to align the metallic oxides formed (that is, MgO and $Fe_2O_3$) to the spinel structure of the ferrite. X-ray diffraction techniques carried out on the coated substrate indicate that the deposited coating corresponds to a magnesium ferrite spinel structure.

The evaluation of the magnetic properties of the magnesium ferrite film prepared as measured at microwave frequencies (X-band) is shown in the following table:

| Material | Thickness (Microns) | Amount Deposited (Mg.) | Resonant Frequency (Mc.) | Resonant Applied Field (Oersteds) | Linewidth (Oersteds) |
|---|---|---|---|---|---|
| $MgO \cdot Fe_2O_3$ | 3.12 | 7.80 | 9093 | 2650 | 1425 |
| $MgO \cdot Fe_2O_3$ | 2.66 | 6.70 | 9081 | 2450 | 1500 |
| $MgO \cdot Fe_2O_3$ | 2.66 | 6.70 | 9087 | 1980 | 1525 |

Though magnesium methylate was used as the stock solution in the above example, other magnesium alcoholates could be used instead. Magnesium methylate is desirable because of its ease of preparation. The preliminary heating in Example 1 can be effected with the aid of a hot plate set on high. In such a case, as is true in Example 1, both sides of the substrate are covered but only one is needed for evaluation. Therefore, one side is removed of its coating with acid or a razor blade.

The substrate used is not critical; all that is required is that it be temperature stable up to 1000° C. Alumina and fused quartz have been found to be most useful as the substrate.

The method described above for making magnesium ferrite film can be applied to the making of other magnetic ferrite films from metal alcoholates as for example, from the alcoholates of nickel, aluminum, barium, manganese, zinc, cobalt, etc.

It is intended that the foregoing description be considered illustrative only and not in limitation of the invention as hereinafter claimed.

What is claimed is:

The method of making magnesium ferrite film including the steps of (1) mixing an iron alcoholate solution with a magnesium alcoholate solution in stoichiometric proportions of 2 moles of iron to 1 mole of magnesium, (2) immersing a substrate in the solution and preliminarily firing the coated substrate at 500° C., (3) repeating the latter steps until the requisite coating thickness has been attained, and (4) firing the coated substrate at 1000° C.

References Cited in the file of this patent
UNITED STATES PATENTS

| | | |
|---|---|---|
| 2,576,456 | Harvey et al. | Nov. 27, 1951 |
| 2,796,364 | Suchoff | June 18, 1957 |
| 2,906,682 | Fahnoe et al. | Sept. 29, 1959 |
| 3,023,166 | Duinker et al. | Feb. 27, 1962 |

OTHER REFERENCES

Economos: "Magnetic Ceramics," Journal of the American Ceramic Society, vol. 38, No. 9, pp. 335–340, September 1955.